United States Patent [19]

Nishikawa et al.

[11] Patent Number: 4,602,520
[45] Date of Patent: Jul. 29, 1986

[54] TELESCOPIC STEERING COLUMN ASSEMBLY

[75] Inventors: Masumi Nishikawa; Masanobu Ishikawa; Hiroki Sato; Shuhei Toyoda; Hakumi Ishii, all of Aichi, Japan

[73] Assignees: Aisin Seiki Kabushiki Kaisha, Kariya; Toyota Jidosha Kabushiki Kaisha, Toyota, both of Japan

[21] Appl. No.: 622,255

[22] Filed: Jun. 19, 1984

[30] Foreign Application Priority Data

Jun. 23, 1983 [JP] Japan .................................. 58-113412
Jul. 8, 1983 [JP] Japan .................................. 58-125197

[51] Int. Cl.$^4$ .............................................. B62D 1/18
[52] U.S. Cl. ...................................... 74/493; 74/89.15; 280/775
[58] Field of Search ................. 74/89.15, 493; 280/775

[56] References Cited

U.S. PATENT DOCUMENTS

| | | | |
|---|---|---|---|
| 1,945,496 | 1/1934 | Sloan et al. | 74/89.15 |
| 2,074,334 | 3/1937 | Hughes | 74/493 |
| 2,769,351 | 11/1956 | Serfling et al. | 74/493 |
| 2,836,988 | 6/1958 | Cashman | 74/493 |
| 3,216,521 | 11/1965 | Ulrich | 280/775 X |
| 3,396,600 | 8/1968 | Zeigler et al. | 74/493 |
| 4,503,504 | 3/1985 | Suzumura et al. | 74/493 |

Primary Examiner—Allan D. Herrmann
Attorney, Agent, or Firm—Burns, Doane, Swecker and Mathis

[57] ABSTRACT

A telescopic steering column assembly in which the length of a steering shaft may be adjusted comprising a pair of shafts which are telescopeable while maintaining rotary engagement, a fixed bracket mountable on a vehicle body for rotatably supporting one of said shafts while restricting the axial movement thereof relative to said fixed bracket, a movable bracket which is movable with respect to said fixed bracket for rotatably supporting the other shaft while restricting the axial movement thereof relative to said movable bracket, screw means including A pair of internally and externally threaded members which threadably engage for effecting the relative movement between said brackets and rotary drive means mounted on one of the brackets for imparting the rotary movement to said screw means.

10 Claims, 5 Drawing Figures

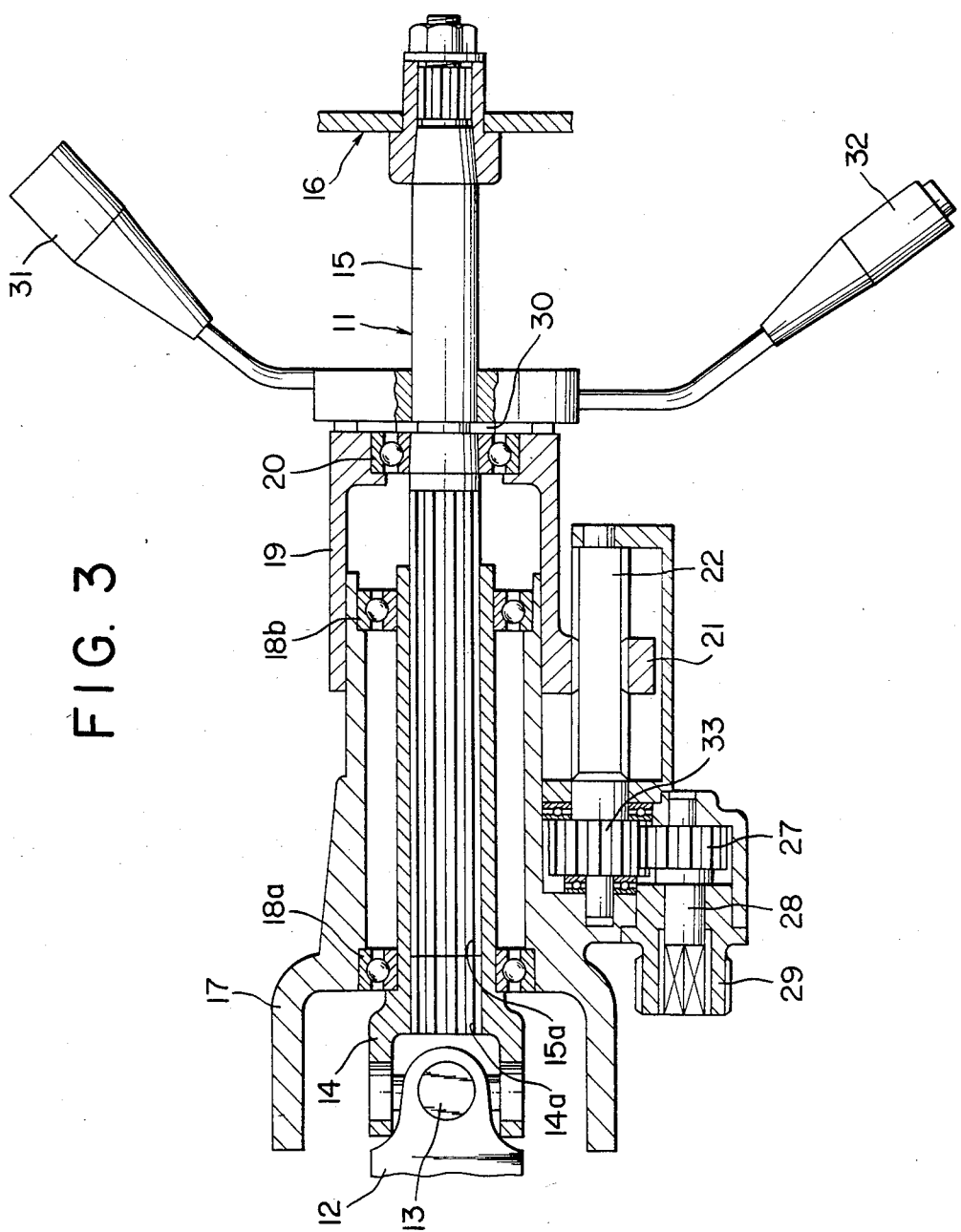

TELESCOPIC STEERING COLUMN ASSEMBLY

FIELD OF THE INVENTION

The present invention relates to a telescopic steering column assembly in which the length of the steering shaft may be adjusted in a telescopic manner, more particularly, to the reduction in size of a telescopic steering column assembly, the length of which is adjusted by means of screw means, or to the improvements in reliability and operation characteristics.

Such a type of conventional telescopic column assembly is disclosed in U.S. Pat. No. 3,396,600. In this assembly a pair of shafts are telescopically disposed. One of the shafts is rotatably supported by a fixed bracket secured to a vehicle body while the other shaft is rotatably supported by a movable bracket. An internally threaded member(nut) which is rotatably mounted on the fixed bracket is threadably engaged with an externally threaded member(screw bolt) rotatably secured to the movable bracket. Accordingly when the nut is rotated by means of a motor and the like, the screw bolt threadably engaging the nut axially moves, whereby the movable bracket having the screw bolt mounted thereon will move relative to the fixed bracket to extend and retract the steering shaft. The rotation of the internally threaded member is stopped when the steering shaft reaches a desired length. The steering shaft is locked at this length by the threadable engagement of the screw bolt and nut.

However the screw bolt moves along the length substantially double as long as the axial length thereof backward and foreward relative to the nut mounted on the fixed bracket since the screw bolt is disposed on the movable bracket. Therefore the conventional assembly has a disadvantage in which the axial space above the steering shaft for the screw bolt is unnecessarily long.

SUMMARY OF THE INVENTION

It is therefore a principal object of the present invention to provide a novel telescopic steering column assembly which overcomes the disadvantage mentioned above.

Besides above, in the named assembly, the screw bolt and nut are disposed excentric of the rotational axis of the shaft, i.e., the axis of telescopic, axial movement thereof, on each brackets. Hence, the axis of the axial movement of the shafts is apart from the axis of the screw movement, which also entrains an insufficient strength upon collision and an unsmooth axial movement of the shafts.

Accordingly, it is another object of the present invention to provide a novel telescopic steering column assembly which has an axis of the screw/nut movement coincident with that of the axial movement of the shafts.

It is still further object of the present invention to provide a simple structure for such telescopic steering column assembly.

Further objects of the present invention will become apparent in the entire disclosure.

According to the first aspect of the present invention, the purpose of the present invention is accomplished by providing a telescopic steering column assembly in which the axial length of a steering shaft may be adjusted comprising:

(a) a pair of shafts which are mutually telescopic while maintaining rotary engagement;

(b) a fixed bracket mountable on a vehicle body for rotatably supporting one of said shafts while restricting the axial movement thereof relative to said fixed bracket;

(c) a movable bracket which is movable with respect to said fixed bracket for rotatably supporting the other shaft while restricting the axial movement thereof relative to said movable bracket;

(d) screw means including a pair of internally and externally threaded members which mutually threadably engage for effecting the relative axial movement between said brackets, said externally threaded member being rotatably supported on the fixed bracket while being secured axially immovable and said internally threaded member being provided on the movable bracket; and (e) rotary drive means which is mounted on one of the brackets for driving said screw means to telescopically displace the movable bracket relative to the fixed bracket.

According to the second aspect of the present invention there is provided a telescopic steering column assembly in which the axial length of a steering shaft may be adjusted comprising:

(a) a pair of shafts which are mutually telescopic while maintaining rotary engagement;

(b) a fixed bracket mountable on a vehicle body for rotatably supporting one of said shafts while restricting the axial movement thereof relative to said fixed bracket;

(c) a movable bracket which is movable with respect to said fixed bracket for rotatably supporting the other shaft while restricting the axial movement thereof relative to said movable bracket;

(d) screw means including a pair of internally and externally threaded members which are provided on and between the pair of said brackets and mutually threadably engage for effecting the relative axial movement between said brackets due to relative rotation therebetween; and (e) rotary drive means which is mounted on one of the brackets for driving said screw means to telescopically displace the movable bracket relative to the fixed bracket.

The primary object of the present invention is accomplished by the 1st and 2nd objects, and the second object is also accomplished by the second aspect. Both aspects provide simple structures.

In the second aspect, a gear as the corresponding rotary drive means is preferably provided on the outer periphery of the movable bracket.

According to the present invention the screw means includes internally and externally threaded members which threadably engage. The externally threaded member is rotatably mounted on, for example, the fixed bracket while secured axially immovably relative to the fixed bracket. The internally threaded member is mounted on the movable bracket.

As a result of this, the internally threaded member which threadably engages the externally threaded member moves along the externally threaded member when the externally threaded member is rotated. The movable bracket having the internally threaded member mounted thereon, in turn, moves relative to the fixed bracket to adjust the length of the steering shaft. Since the externally threaded member never axially moves along the steering shaft, the space required for mounting the externally threaded member on the steering shaft may be as large as the externally threaded member per se. The purpose of the present invention may be thus accomplished.

Furthermore, the telescopic steering column assembly is axially shortened so that it may be disposed between the tilt center of the steering column and the steering wheel. Therefore, a shock absorber may be disposed under the steering column even if the steering column has a telescopic mechanism.

The reduction in the length also provides further advantages, e.g., improvement in the operability and comfort of the driver, providing a space for other necessary equipment and the like.

In the second aspect of the present invention, the brackets comprise coaxial hollow cylinders. The screw means comprises an externally threaded portion on the outer periphery of one of the brackets and an internally threaded portion on the inner periphery of the other bracket, the internally threaded portion being threadably engaged with the externally threaded portion. The rotary drive means comprises a first gear around the other periphery of the movable bracket and a second gear which meshes the first spur gear.

Accordingly, the movable bracket moves in relation to the fixed bracket since the movable bracket threadably engages the fixed bracket when th movable bracket is rotated by the rotary drive means. The shaft supported by the movable shaft axially displaces relative to the other shaft suppored by the fixed bracket so that the length of the steering shaft is adjusted. Furthermore, the movable bracket is threadably engaged with the fixed bracket by means of a combination of the external and internal threads therebetween which are coaxial with the shafts. Therefore, the movable bracket moves coaxially with the shafts so that the telescopic movement of the shafts is carried out very smoothly.

In accordance with the second aspect of the present invention a load applied upon each of th shafts is transmitted to one bracket via the other bracket so that the distribution of the load is uniform around the axis of the shafts. Therefore, the shafts are supported by the brackets without any bending moment in relation to the brackets. The second aspect thus provides also an advantage in that the mechanical strength of the steering column may be enhanced.

BRIEF DESCRIPTION OF THE DRAWINGS

FIG. 3 is an elevational view showing another modified embodiment of the present invention;

DETAILED DESCRIPTION OF THE PREFERRED EMBODIMENTS

Figure 1:
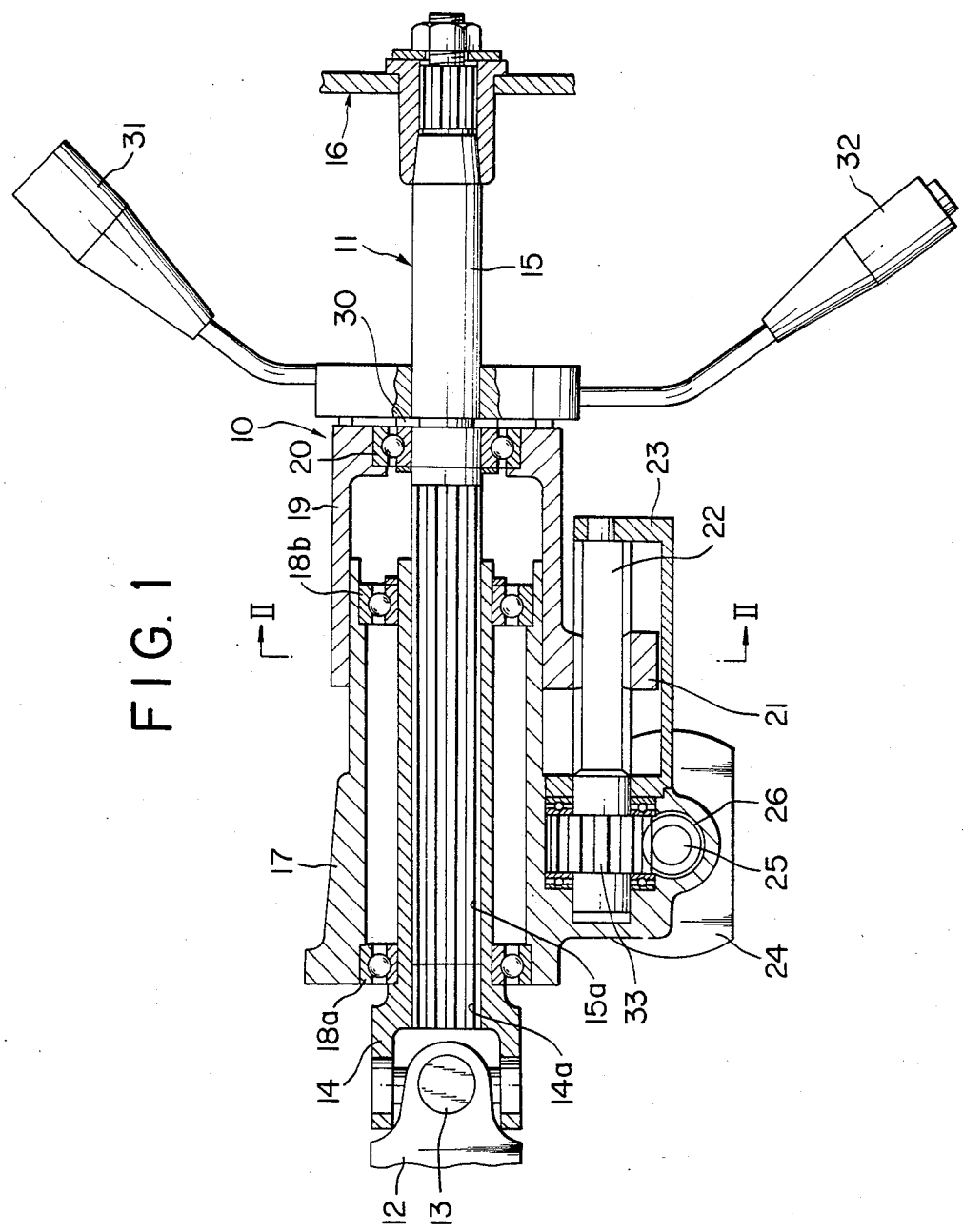
FIG. 1 is an elevational sectional view showing one embodiment of the telescopic steering column according to the first aspect of the present invention.

The present invention will be described with reference to the embodiments illustrated in the drawings.

A steering column assembly 10 shown in FIG. 1 comprises a steering shaft 11 including a main shaft 12, a hollow outer shaft 14 which is linked with the main shaft through a pivot pin 13 which constitutes a tilt center, and an inner shaft 15 which is adapted in the outer shaft 14 axially movably relative thereto. The main shaft 12 is operatively connected with a steering gear (not shown) at the left end thereof. The inner shaft 15 is provided with a serrated or splined portion at the right end thereof, with which a steering wheel 16 is engaged. Hence the rotation of the steering wheel 16 causes the inner and outer shafts 14 and 15, in turn the main shaft 12, to rotate via axially splined portions 14a and 15a which are formed on the inner surface of the outer shaft 14 and the outer surface of the inner shaft respectively.

The outer shaft 14 is rotatably mounted on a fixed bracket 17 by a pair of bearings 18a and 18b. The fixed bracket 17 is secured on a vehicle body by means of a pin (not shown) to allow tilting. The inner shaft 15 is rotatably mounted on a movable bracket 19 by a bearing 20. The above description is common to embodiments according to the first and second aspects.

Now, particularly referring to the first aspect, a movable bracket 19 has a left (in FIG. 1) end portion which is adapted on the outer periphery of the right end of the fixed bracket 17 so that the movable bracket 19 can move in an axial direction (rightward and leftward in FIG. 1). The movable bracket 19 has also a right end which firmly secures a bearing 20 together with a stopper ring 30 which is secured to the inner shaft 15. The movable bracket 19 is provided with an internally threaded portion on a nut member 21. An externally threaded member (bolt) 22 which threadably engages the internally threaded portion (nut portion) 21 is rotatably journalled by a supporting bracket 23 at the opposite ends thereof. The supporting bracket 23 is secured to the fixed bracket 17. The supporting bracket 23 houses and covers the externally threaded bolt 22 and provides a space within which the nut portion 21 moves.

The externally threaded bolt 22 is provided with a gear 33 integral with the bolt 22 at the left end thereof. The gear 33 is meshing with a worm gear 26 secured to a shaft 25 of a motor 24. The motor 24 is mounted on the fixed bracket 17. Accordingly, rotation of the motor 24 causes the externally threaded bolt 22 to rotate. Switch devices 31 and 32 are supported on the inner shaft 15 and secured to the movable bracket 19. The switch devices are adapted to control direction indicators (winkers), lights, wipers and rotary drive means etc.

A modified embodiment of the first aspect of the present invention will be described in which a drive portion such as manually operatable portion or motor etc., may be remotely controlled through a joint and a flexible tube. Referring now to FIG. 3, the gear 33 meshes with a gear 27, and a joint portion 29 is provided on a rotary shaft 28 of the gear 27, instead of the worm gear assembly (25,26) of FIG. 1. The other portions are identical with those in the afore-mentioned embodiment of FIG. 1. The explanation thereof is omitted for simplicity of the description.

In both embodiments, by rotating the motor 24 or joint portion 29, the gear 33 is rotated to cause the externally threaded bolt 22 to rotate. This results in the axial (forward and backward) movement of the nut portion 21 along the externally threaded bolt 22 so that the movable bracket 19 having the nut portion 21 axially moves relative to the fixed bracket 17. Thus the extent of the insertion of the inner shaft 15 into the outer shaft 14, that is, the length of the steering shaft 10 is adjusted. When the steering shaft reaches a desired length the rotation of the motor 24 or the joint 29 is stopped. The inner shaft may be locked in a position with respect to the outer shaft 14 by the threaded engagement between the externally threaded bolt 22 and the nut portion 21.

Furthermore, the externally threaded bolt 22 does not axially move relative to the steering shaft 10. Only the nut portion 21 moves along the externally threaded bolt 22. Therefore the requirement for the space in the axial direction of the steering shaft is only that in the axial length of the externally threaded bolt 22.

Due to such requirement, an externally threaded shaft 22, that is, a telescopic mechanism may be disposed between the pivot pin 13, which constitutes the tilt center, and the steering wheel 16. A shock absorber may also be disposed between the pivot pin 13 and the steering gear (not shown).

Figure 2:
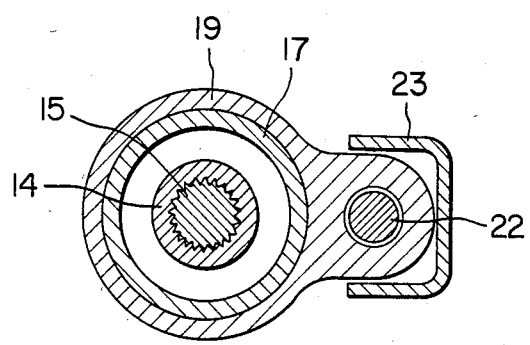
FIG. 2 is a sectional view taken along the line II—II of FIG. 1.

Another modified embodiment according to the second aspect of the present invention will be described with reference to FIGS. 4 and 5. In this embodiment like numerals designate like parts of FIGS. 1 to 3. The description of the common parts are basically omitted for simplicity of the description.

Figure 5:
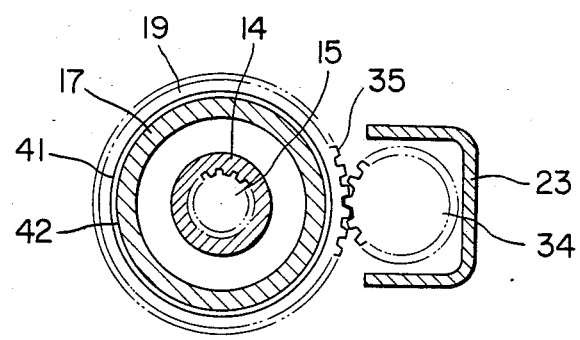
FIG. 5 is a sectional view taken along th line V—V of FIG. 4.
Figure 4:
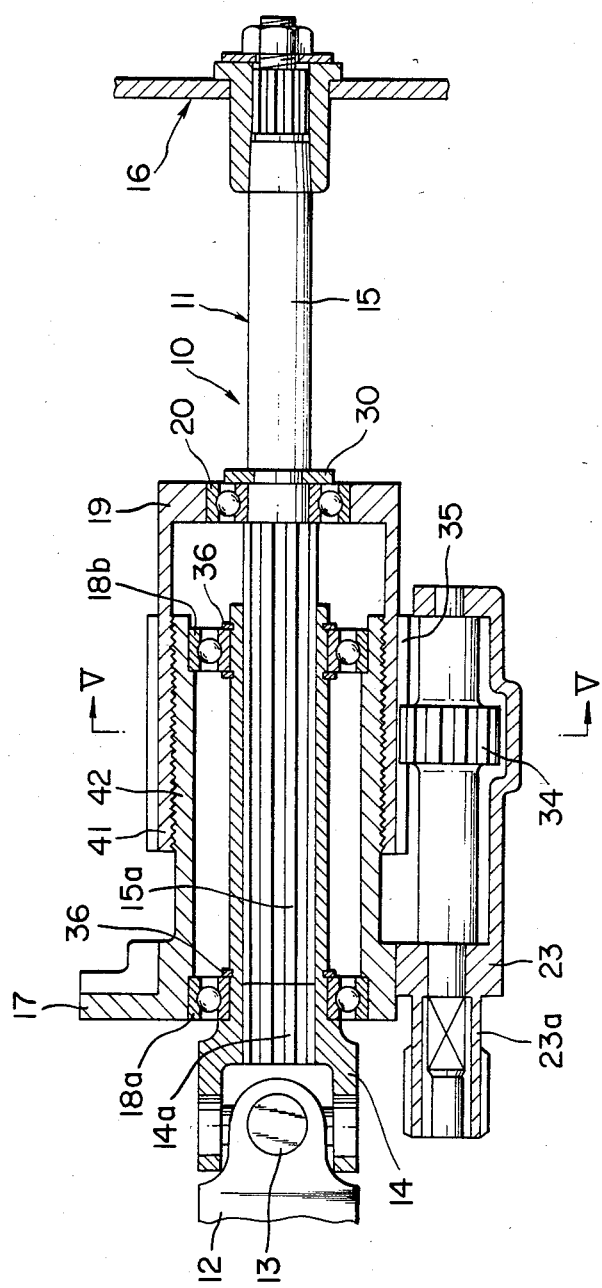
FIG. 4 is an elevational sectional view showing further embodiment according to the second aspect of the present invention.

Referring to FIGS. 4 and 5, a fixed bracket 17 is mounted on the vehicle body (not shown) so that it will not move at least axially of the steering shaft 11. A bearing 20 is firmly secured between the right end of the movable bracket 19 and a stopper ring 30 secured to an inner shaft 15. A pair of bearings 18a and 18b are secured to an outer shaft 14 by means of stopper rings 36 secured to the outer shaft 14.

The fixed bracket 17 is provided with an externally threaded portion 42 on the outer periphery at the right end thereof. The externally threaded portion 42 is coaxial with the outer or inner shaft 14 or 15. On the inner periphery of the left end portion of the movable bracket 19 which is in the form of a cylinder, there is provided an internally threaded portion 41 which is coaxial with the shaft 15. The internally threaded portion 41 threadably engages the externally threaded portion 42 of the fixed bracket 17 (refer to FIG. 4). On the outer periphery to the movable bracket 19 there is provided a spur (or helical) gear 35.

A supporting bracket 23 is mounted on the fixed bracket 17. The rotary shaft 28a of the gear 34 is journalled at both opposite ends by means of the supporting bracket 23. The gear 34 meshes with the spur gear 35 of the movable bracket 19 (refer to FIG. 4). The left end of the rotary shaft 28a of the gear 34 extends into the joint 23a of the supporting bracket 23 so that the rotary shaft may be linked with a rotary shaft of a motor etc. (not shown).

In operation, the movable bracket 19 having a spur gear 35 meshing with the gear 34 is rotated around the steering shaft 11 when the gear 34 is rotated by a motor and the like (not shown). Since the movable bracket 19 has the internally threaded portion 41 which threadably engages the externally threaded portion 42 of the fixed bracket 17, the movable bracket 19 axially moves relative to the fixed bracket 17. Thus the inner shaft 15 supported by the movable bracket 19 is axially displaced relative to the outer shaft 14 so that the length of the steering shaft 11, that is, the axial position of the steering wheel 16 is adjusted.

Upon this adjustment the movable bracket 19 axially moves along the axis of the inner shaft 15 while rotating thereabout since the externally threaded portion 42 and the internally threaded portion 41 of the movable bracket 19 are coaxial with the inner and outer shafts 15 and 14. This results in exceedingly smooth movement of the inner shaft 15.

Furthermore, the internally and externally threaded portions 41 and 42 are coaxial with each other around the inner shaft 15 or outer shaft 14. Accordingly, the movable bracket 19 is uniformly supported around the outer shaft 14. The inner shaft 15 is smoothly and steadily supported by the movable and fixed brackets 19 and 17 without suffering bending moment even when any load is exerted upon the steering wheel 16.

As hereinabove desclosed, the present invention provides a novel, simple telescopic arrangement for the telescopic column assembly with a shortest axial length and space for the telescopic adjustment and the steady and smooth adjustment. Other features and advantages which are apparent in the entire disclosure includes, e.g., simple construction, ample space for the other equipment for steering or the like, and comfort for the driver.

It should be noted that the embodiments as disclosed with reference to the drawings are presented for better illustration of the present invention and not for a limitative purpose. Modifications may be made without departing from the concept of the present invention as herein disclosed and claimed.

What is claimed is:

1. A telescopic steering column assembly in which the axial length of a steering shaft may be adjusted comprising:
    (a) a pair of shafts which are mutually telescopic while maintaining rotary engagement;
    (b) a fixed bracket mountable on a vehicle body of rotatably supporting one of said shafts while restricting the axial movement thereof relative to said fixed bracket;
    (c) a movable bracket which is movable with respect to said fixed bracket for rotatably supporting the other shaft while restricting the axial movement thereof relative to said movable bracket;
    (d) screw means including a pair of internally and externally threaded members which mutually threadably engage for effecting the relative axial movement between said brackets, said externally threaded member being rotatably supported on the fixed bracket while being secured axially immovable by said fixed bracket and said internally threaded member being provided on the movable bracket; and
    (e) rotary drive means mounted on the fixed bracket for driving said externally threaded member relative to said internally threaded member to telescopically displace the movable bracket relative to the fixed bracket.

2. The telescopic steering column assembly as defined in claim 1, in which said internally threaded member is formed integrally with the movable bracket.

3. The telescopic steering column assembly as defined in claim 1, in which said rotary drive means includes a worm gear assembly having a worm wheel provided on one end of the externally theaded member and a worm gear which meshes with the worm wheel.

4. The telescopic steering column assembly as defined in claim 1, in which said rotary drive means includes a first gear provided on one end of the externally threaded member and a second gear which meshes with said first gear.

5. The telescopic steering column assembly aa defined in claim 1, in which the assembly further includes switch devices secured on said movable bracket for controlling the actuation of said rotary drive means.

6. The telescopic steering column assembly as defined in claim 1, in which said rotary drive means includes a gear assembly meshed with a gear portion of said movable bracket and said gear assembly having a joint portion.

7. A telescopic steering column assembly in which the axial length of a steering shaft may be adjusted comprising:
 (a) a pair of shafts which are mutually telescopic while maintaining rotary engagement;
 (b) a fixed bracket having an exterior surface, said fixed bracket being mountable on a vehicle body for rotatably supporting one of said shafts while restricting the axial movement thereof relative to said fixed bracket;
 (c) a movable bracket having an interior surface, said movable bracket being movable with respect to said fixed bracket for rotatably supporting the other shaft while restricting the axial movement thereof relative to said movable bracket;
 (d) screw means including a pair of internal and external threads which mutually engage for effecting the relative axial movement between the bracketes, said external thread being formed at the exterior surface of the fixed bracket and said internal thread being formed at the interior surface of the movable bracket; and
 (e) rotary drive means mounted on the fixed bracket for driving said screw means to telescopically displace the movable bracket relative to the fixed bracket.

8. The telescopic steering column assembly as defined in claim 7, in which said rotary drive means includes a first gear provided around the outer periphery of the movable bracket and a second gear which is rotatably supported by said fixed bracket and meshes with said first gear.

9. The telescopic steering column assembly as defined in claim 7, in which the assembly further includes switch means secured on said movable bracket for controlling the actuation of said rotary drive means.

10. The telescopic steering column assembly as defined in claim 7, in which said rotary drive means includes a gear assembly meshed with a gear portion of said movable bracket and said gear assembly having a joint portion.

* * * * *